(No Model.)
F. S. FOOTE.
KNIFE.
No. 395,821.   Patented Jan. 8, 1889.
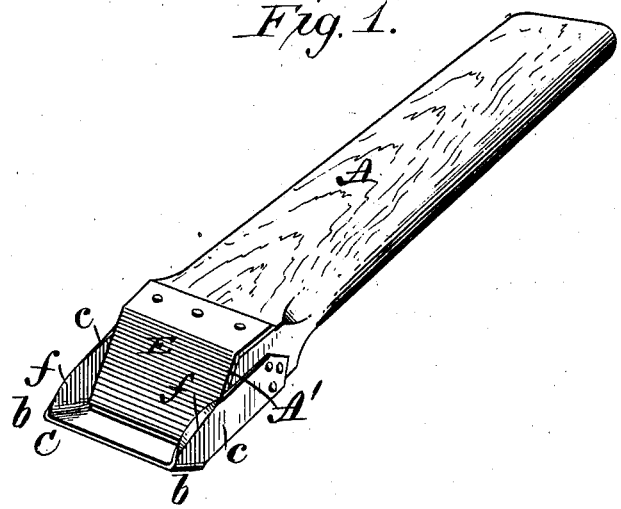
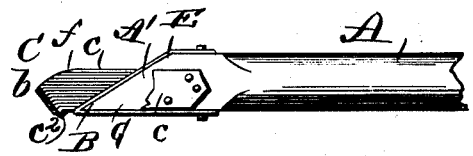
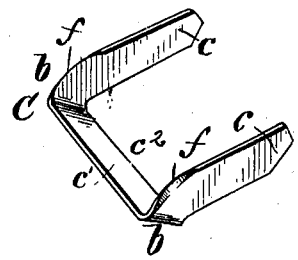
WITNESSES:
INVENTOR:
BY
ATTORNEYS.

United States Patent Office.

FREDERICK S. FOOTE, OF NEW YORK, N. Y.

KNIFE.

SPECIFICATION forming part of Letters Patent No. 395,821, dated January 8, 1889.

Application filed August 27, 1888. Serial No. 283,879. (No model.)

*To all whom it may concern:*

Be it known that I, FREDERICK S. FOOTE, of the city, county, and State of New York, have invented a new and Improved Vegetable-Knife, of which the following is a full, clear, and exact description.

My invention consists of a novel knife constructed as hereinafter described and claimed whereby vegetables can easily and rapidly be pared without unnecessary waste. My new knife is also designed for dressing and slicing cocoanut.

Reference is to be had to the accompanying drawings, forming a part of this specification, in which similar letters of reference indicate corresponding parts in all the figures.

Figure 1 is a perspective view of my new and improved knife. Fig. 2 is a broken side elevation of the same, and Fig. 3 is a perspective view of the blade removed from the handle.

A represents the handle of the knife, made by preference of wood and beveled at its front end, as shown at A', to form the edge B on a plane with the lower surface of the handle.

C is the blade, formed with the side members, $c\ c$, by which it is secured to the handle A. The central portion, $c'$, of the blade is formed with the cutting-edge $c^2$, which stands a short distance in front of the edge B of the handle and projects slightly below it, as shown clearly in Fig. 2. One or both of the side members, $c\ c$, of the blade are curved at the upper edge and sharpened near the angle $b$ to form blades $f$, by which the eyes of potatoes or depressions in any vegetable being pared may be cleaned and the skin removed.

The handle A is faced with sheet metal, E, as shown clearly in Figs. 1 and 2, over the beveled portion and upon the under surface to obviate wear, and the lower surface of the handle is made flat, as shown at G, to act as a guard to prevent the knife $c^2$ from entering the vegetable or object being cleaned or sliced too great a distance. In paring this effects a great saving, and no attention need be paid to the work, as it is impossible to cut too deep.

Having thus described my invention, what I claim as new, and desire to secure by Letters Patent, is—

1. The handle A, beveled at A' and formed with the guard-surface G, in combination with the blade C, formed with side members, $c\ c$, secured to handle A, and formed with the blade $c^2$ parallel with the front edge, B, of the handle, substantially as described.

2. The handle A, beveled at its front end, in combination with the blade C, having cutting-edge $c^2$ and side members, $c$, formed at the upper edge with the cutting-edge $f$, substantially as described.

FREDERICK S. FOOTE.

Witnesses:
   H. A. WEST,
   C. SEDGWICK.